US006834672B2

United States Patent
Chen

(10) Patent No.: US 6,834,672 B2
(45) Date of Patent: Dec. 28, 2004

(54) AIR PRESSURE AND FLOW REGULATING VALVE AND PNEUMATIC TOOL

(76) Inventor: Li Chen Chen, No. 50, Chien Tsun East Rd., Taya Hsiang, Taichung Hsien (TW)

( * ) Notice: Subject to any disclaimer, the term of this patent is extended or adjusted under 35 U.S.C. 154(b) by 144 days.

(21) Appl. No.: 10/342,392

(22) Filed: Jan. 15, 2003

(65) Prior Publication Data

US 2004/0134541 A1 Jul. 15, 2004

(51) Int. Cl.[7] ............................................. F16K 37/00
(52) U.S. Cl. .................. 137/557; 137/505.42; 137/613; 251/121; 251/352; 138/46
(58) Field of Search ........................ 137/505.41, 505.42, 137/557, 613; 251/121, 345, 352; 138/46

(56) References Cited

U.S. PATENT DOCUMENTS

| | | | | |
|---|---|---|---|---|
| 232,003 A | * | 9/1880 | Collins | 137/613 |
| 1,007,664 A | * | 11/1911 | Baker | 138/46 |
| 1,272,263 A | * | 7/1918 | Hooker | 138/46 |
| 1,319,782 A | * | 10/1919 | Maul | 137/613 |
| 1,856,505 A | * | 5/1932 | Persson | 251/358 |
| 2,061,794 A | * | 11/1936 | Deming | 137/505.42 |
| 2,595,156 A | * | 4/1952 | Matasovic | 137/505.42 |
| 2,908,158 A | * | 10/1959 | Jacobsson | 137/505.44 |
| 3,102,549 A | * | 9/1963 | Worden et al. | 137/505.42 |
| 3,586,045 A | * | 6/1971 | Zimmer | 137/595 |
| 5,398,721 A | * | 3/1995 | Pryor | 137/613 |
| 5,678,602 A | * | 10/1997 | Cannet et al. | 137/505.25 |
| 6,484,750 B1 | * | 11/2002 | Foos et al. | 137/505.25 |

* cited by examiner

Primary Examiner—John Rivell
(74) Attorney, Agent, or Firm—Rosenberg, Klein & Lee

(57) ABSTRACT

An air pressure and flow regulating valve for pneumatic tool mainly includes a valve body, a pressure regulator and a flow regulator connected to one side and a top, respectively, of the valve body, and an air inlet connector provided at a bottom of the valve body. By rotating a first turning knob provided on the pressure regulator, a narrow passage is produced in the valve body between the air inlet connector and the flow regulator, so that a pressure of air supplied into the pneumatic tool via the flow regulator is controllable via the size of the narrow passage. By rotating a second turning knob mounted around the flow regulator to fully open, partially shield, or fully close an outer air passage hole provided on the flow regulator, speed and flow of air supplied into the pneumatic tool can be changed under control.

1 Claim, 5 Drawing Sheets

AIR PRESSURE AND FLOW REGULATING VALVE AND PNEUMATIC TOOL

FIELD OF THE INVENTION

The present invention relates to an air pressure and flow regulating valve for pneumatic tool enabling a user to regulate pressure and flow of air supplied to a pneumatic tool with only one single valve.

BACKGROUND OF THE INVENTION

A pneumatic tool typically includes a pressure valve having a pressure gauge attached thereto. The pressure valve is operable to regulate pressure of air supplied into the pneumatic tool, so that the tool is adaptable for use in different places for different purposes, and the pressure gauge indicates status of working air pressure of the pneumatic tool. The conventional pressure valve is adjustable through complicate procedures, and has only one function, that is, to regulate the air pressure for the pneumatic tool. There is not any commercially available product that controls not only pressure but also flow of air supplied to the pneumatic tool. Therefore, the conventional pneumatic tool has limited working efficiency that could not be upgraded up to date.

SUMMARY OF THE INVENTION

A primary object of the present invention is to provide an air pressure and flow regulating valve for pneumatic tool to enable control of both pressure and flow of air supplied to a pneumatic tool with only one single valve, making the pneumatic tool highly efficient for use.

To achieve the above and other objects, the air pressure and flow regulating valve for pneumatic tool according to the present invention mainly includes a valve body, a pressure regulator and a flow regulator connected to one side and a top, respectively, of the valve body, and an air inlet connector provided at a bottom of the valve body.

The pressure regulator is internally provided from outer to inner end with an outer push rod, a first spring, an inner push rod, a rubber ring, and a second spring. By rotating a first turning knob provided on the pressure regulator, the first spring is compressed by the outer push rod to push the inner push rod into the valve body and produce a narrow passage in the valve body between the air inlet connector and the flow regulator, so that the pressure of air supplied into the pneumatic tool via the flow regulator is controllable via the size of the narrow passage.

The flow regulator is provided at an inner end with axially aligned and suitably spaced inner and outer air passage holes. A second turning knob having a beveled inner end is mounted around the flow regulator. By rotating the second turning knob, the beveled inner end thereof is able to fully open, partially shield, or fully close the outer air passage hole provided on the flow regulator, enabling speed and flow of air supplied into the pneumatic tool to be changed under control.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
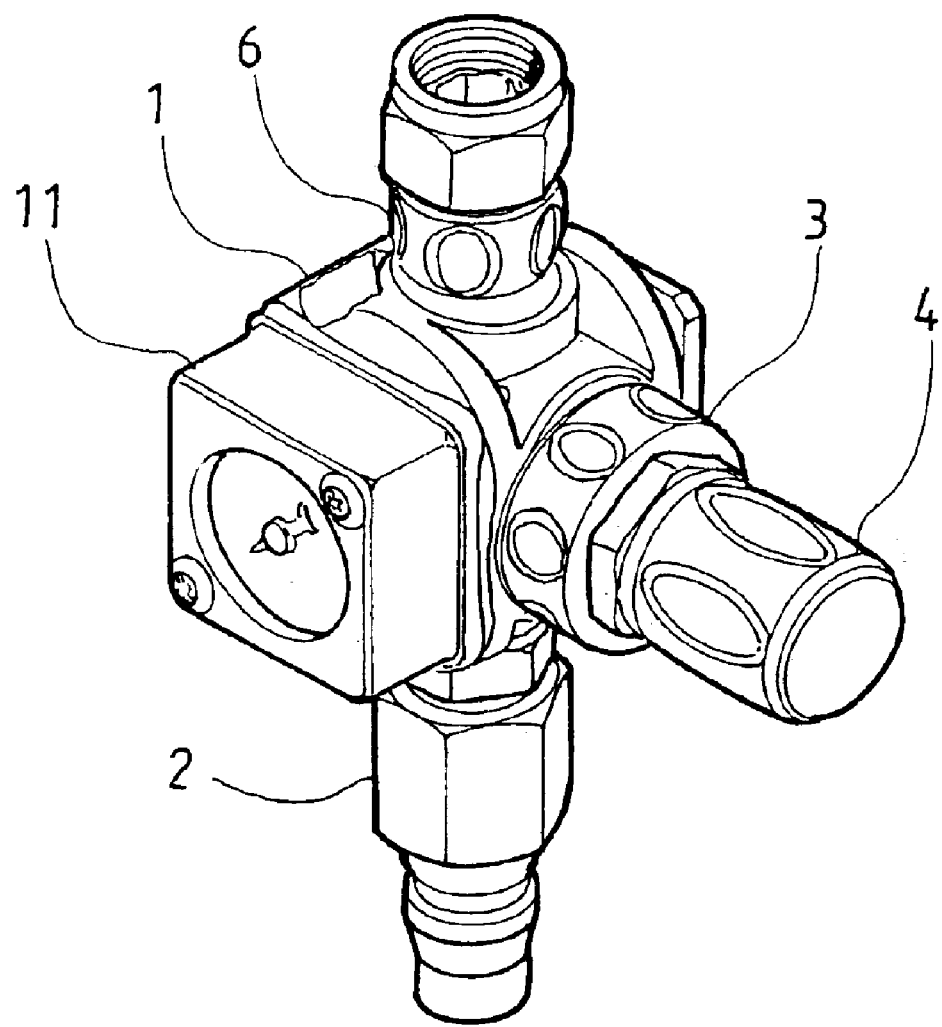
FIG. 1 is an assembled perspective view of an air pressure and flow regulating valve for pneumatic tool according to the present invention.
Figure 2:
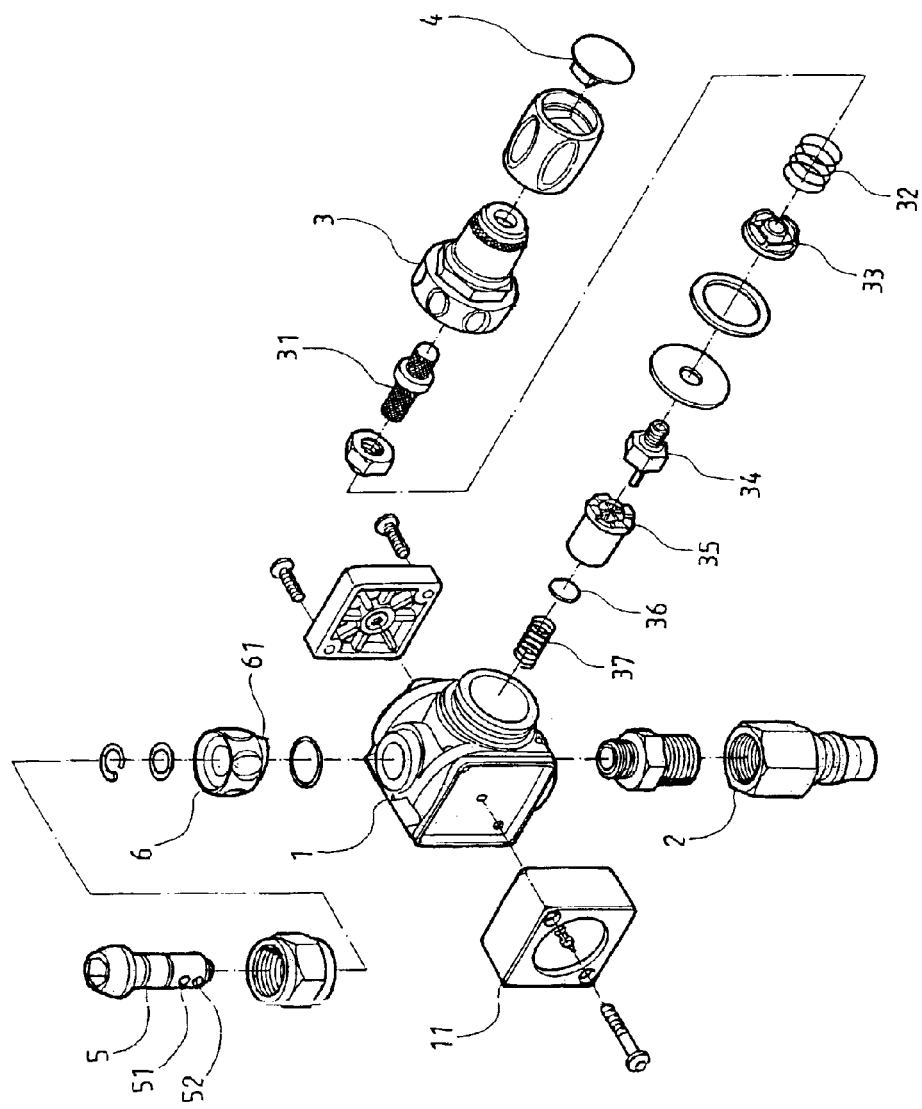
FIG. 2 is an exploded perspective view of FIG. 1.
Figure 3:
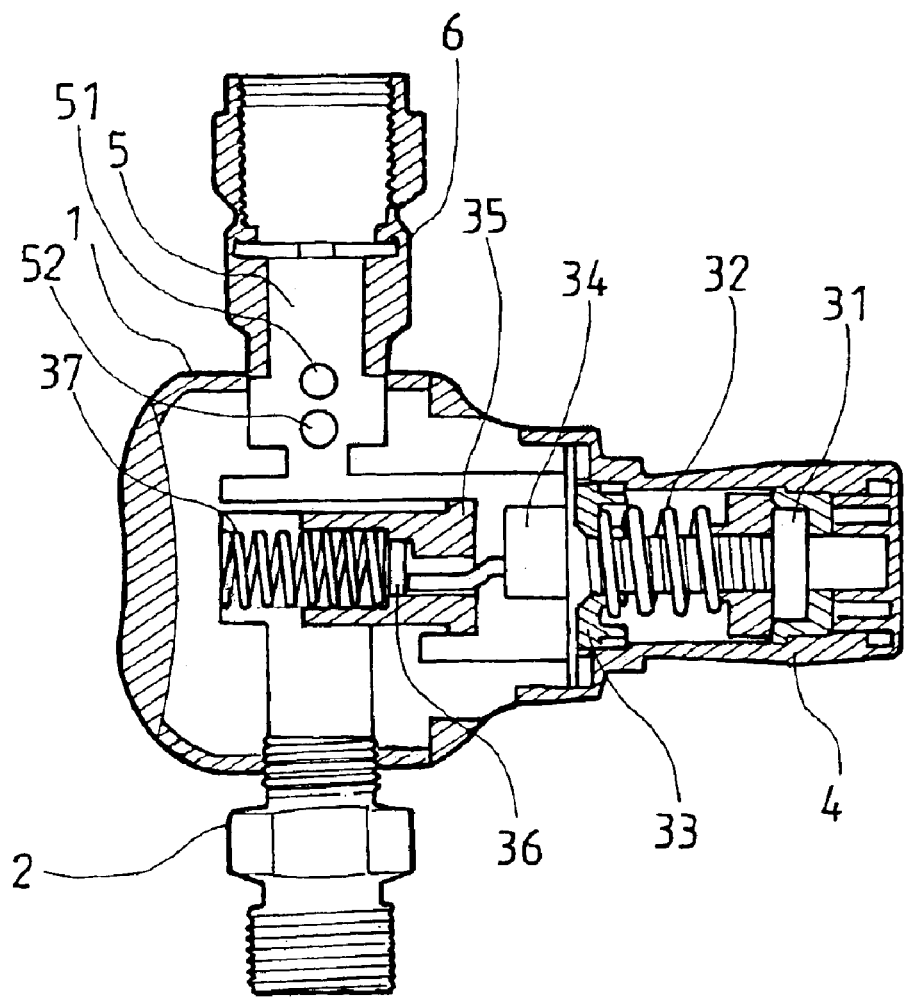
FIG. 3 is a sectioned side view of FIG. 1.

Please refer to FIGS. 1, 2 and 3 that are sequentially assembled perspective, exploded perspective, and sectioned side views of an air pressure and flow regulating valve for pneumatic tool according to the present invention. As shown, the air pressure and flow regulating valve includes a valve body 1, a pressure gauge 11 provided to one side of the valve body 1, an air inlet connector 2 connected to a bottom of the valve body 1, a pressure regulator 3 connected to another side of the valve body 1 adjacent to the pressure gauge 11, a first turning knob 4 connected to an outer end of the pressure regulator 3, a flow regulator 5 connected to a top of the valve body 1, and a second turning knob 6 mounted around the flow regulator 5.

As can be clearly seen from FIG. 2, the pressure regulator 3 internally includes from outer to inner end an outer push rod 31, a first spring 32 put on an inner end of the outer push rod 31, a spring seat 33 for receiving an inner end of the first spring 32, an inner push rod 34 having an inner end forward extended into a valve seat 35 located in the valve body 1, a rubber ring 36 located in the valve seat 35 at an inlet thereof, and a second spring 37 located in the valve seat 35 between the inner push rod 34 and an inner wall of the valve body 1.

The flow regulator 5 connected to the top of the valve body 1 is provided near an inner end with axially aligned and suitably spaced outer and inner air passage holes 51 and 52, respectively. The second turning knob 6 mounted around the flow regulator 5 has a beveled inner end to provide a shielding portion 61, which is located at a position corresponding to the outer air passage hole 51.

Figure 4:
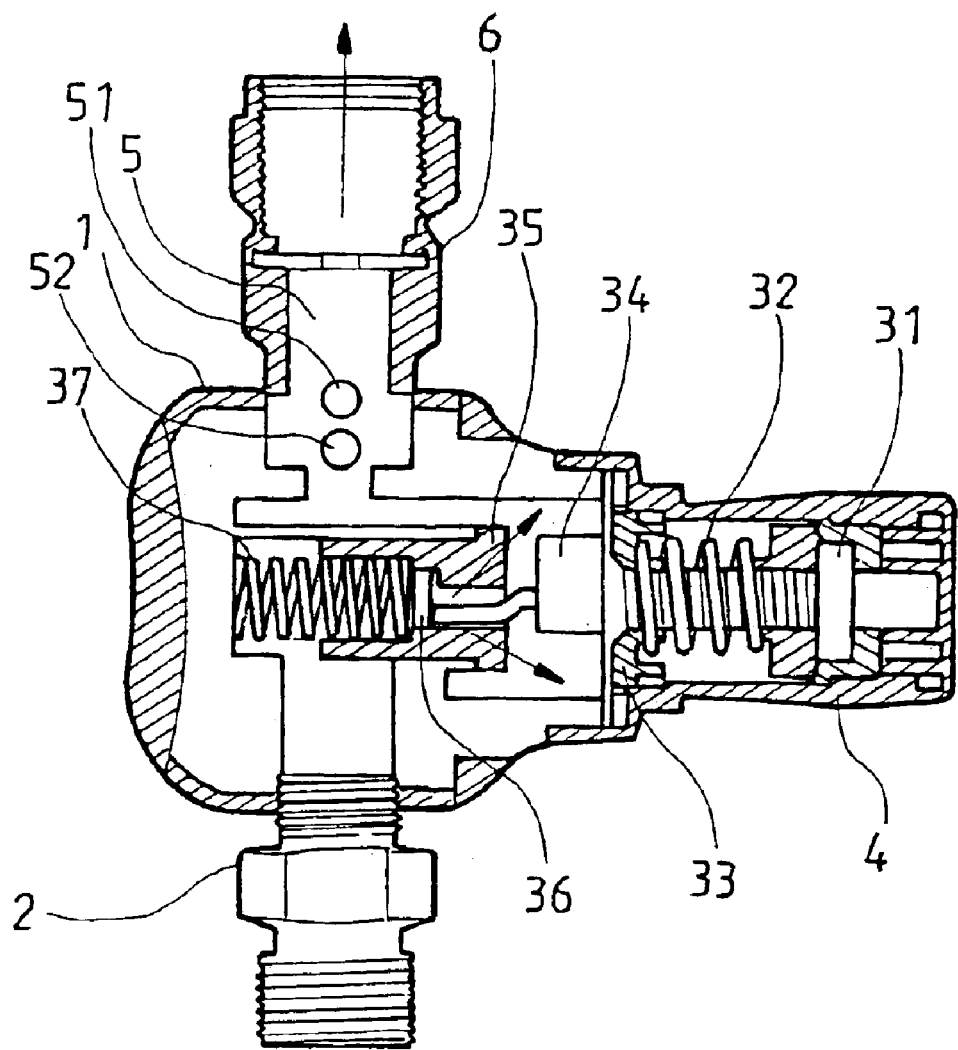
FIG. 4 shows the manner of regulating air pressure for a pneumatic tool with the air pressure and flow regulating valve of the present invention.

Please refer to FIG. 4. To regulate the pressure of air supplied into a pneumatic tool to which the air pressure and flow regulating valve of the present invention is mounted, simply rotate the first turning knob 4. When the first turning knob 4 is rotated to compress the first spring 32, the inner push rod 34 is pushed inward by the first spring 32 to separate the rubber ring 36 from the inlet of the valve seat 35, so that a narrow passage is produced between the rubber ring 36 and the inlet of the valve seat 35 for air supplied into the valve body 1 from the air inlet connector 2 to flow toward the flow regulator 5 via the narrow passage. The narrow passage between the rubber ring 36 and the inlet of the valve seat 35 is size-changeable through control of the first turning knob 4. And, pressure of the air supplied to the pneumatic tool via the flow regulator 5 is controllable through different sizes of the narrow passage between the rubber ring 36 and the inlet of the valve seat 35.

Figure 5C:
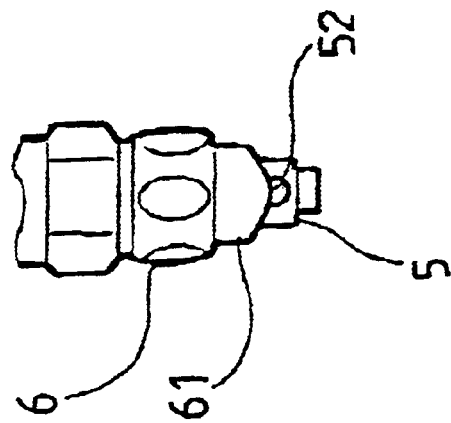
FIGS. 5A, 5B and 5C show the manner of regulating air flow for a pneumatic tool with the air pressure and flow regulating valve of the present invention.
Figure 5B:
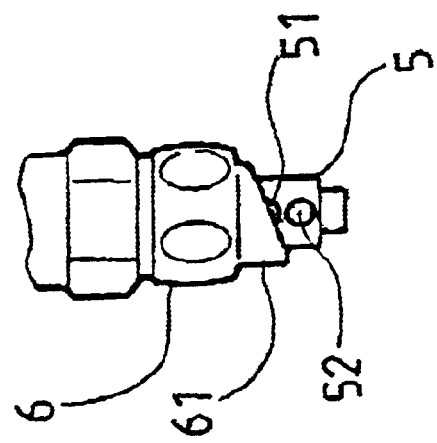
Figure 5A:
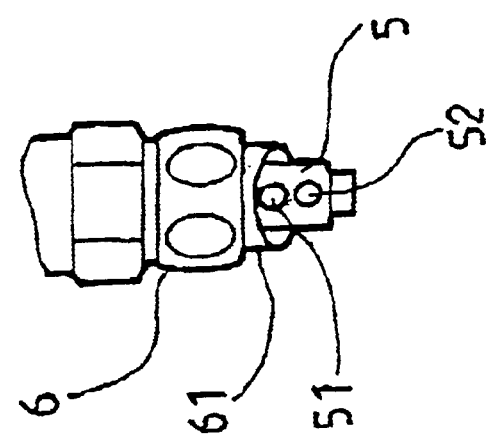

Please refer to FIGS. 5A to 5C. When the second turning knob 6 is rotated, it is possible to bring the shielding portion 61 of the second turning knob 6 to different positions to either completely open the outer air passage hole 51, as shown in FIG. 5A, or partially shield the outer air passage hole 51, as shown in FIG. 5B, or completely close the outer air passage hole 51, as shown in FIG. 5C, so as to change speed and amount of air supplied to the pneumatic tool via the flow regulator 5 and thereby achieve the effect of regulating air flow for the pneumatic tool.

The present invention enables control of pressure and flow of air supplied to a pneumatic tool with only one single valve, and is therefore practical and effective for use.

What is claimed is:

1. An air pressure and flow regulating valve for pneumatic tool, comprising:

a valve body having a pressure gauge provided to one side thereof and an air inlet connector connected to a bottom thereof;

a pressure regulator connected to another side of said valve body adjacent to said pressure gauge, and having a first turning knob connected to an outer end of said pressure regulator; and a flow regulator connected to a top of said valve body and having a second turning knob mounted therearound;

said pressure regulator internally including from outer to inner end an outer push rod, a first spring put on an inner end of said outer push rod, a spring seat for receiving an inner end of said first spring, an inner push rod having an inner end forward extended into a valve seat located in said valve body, a rubber ring located in said valve seat at an inlet thereof, and a second spring located in said valve seat between said inner push rod and an inner wall of said valve body; and said flow regulator being provided near an inner end with outer and inner air passage holes that are axially aligned and spaced by a predetermined distance, and said second turning knob mounted around said flow regulator having a beveled inner end to provide a shielding portion, which is located at a position corresponding to said outer air passage hole on said flow regulator;

whereby when said first turning knob is rotated, said first spring is compressed to push said inner push rod inward, separating said rubber ring from the inlet of said valve seat and producing a narrow passage therebetween for air supplied into said valve body to flow toward said flow regulator via said narrow passage at a pressure controllable by a size of said narrow passage; and when said second turning knob is rotated, said shielding portion of said second turning knob is brought to different positions to either completely open, partially shield, or completely close said outer air passage hole on said flow regulator, enabling change of speed and amount of air supplied to the pneumatic tool via said flow regulator.

* * * * *